(12) United States Patent
McCracken, Jr.

(10) Patent No.: US 11,070,538 B1
(45) Date of Patent: Jul. 20, 2021

(54) TECHNICAL LAYER FOR PORTABLE ELECTRONIC ASSISTANT

(71) Applicant: T-MOBILE INNOVATIONS LLC, Overland Park, KS (US)

(72) Inventor: Billy G. McCracken, Jr., Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/874,573

(22) Filed: May 14, 2020

(51) Int. Cl.
| H04L 29/06 | (2006.01) |
| H04W 12/06 | (2021.01) |
| H04L 29/08 | (2006.01) |
| H04L 12/28 | (2006.01) |
| H04W 12/08 | (2021.01) |

(52) U.S. Cl.
CPC .......... *H04L 63/08* (2013.01); *H04L 12/2803* (2013.01); *H04L 67/02* (2013.01); *H04L 67/42* (2013.01); *H04W 12/06* (2013.01); *H04W 12/08* (2013.01)

(58) Field of Classification Search
CPC ..... H04L 63/08; H04L 12/2803; H04L 67/02; H04L 67/42; H04W 12/06; H04W 12/08
See application file for complete search history.

(56) References Cited

U.S. PATENT DOCUMENTS

| 2014/0244834 | A1* | 8/2014 | Guedalia | H04W 4/21 709/224 |
| 2018/0115802 | A1* | 4/2018 | Knox | H04N 21/6582 |
| 2018/0196865 | A1* | 7/2018 | Rabin | H04L 63/0428 |
| 2019/0281095 | A1* | 9/2019 | Ein-Gil | H04L 67/16 |
| 2020/0127451 | A1* | 4/2020 | Elberbaum | H01R 24/525 |
| 2020/0364588 | A1* | 11/2020 | Knox | G06K 9/6268 |
| 2020/0380968 | A1* | 12/2020 | Hatfield | G07C 9/00896 |
| 2020/0394436 | A1* | 12/2020 | Rakshit | H04L 67/12 |
| 2021/0012563 | A1* | 1/2021 | Strugar | G06T 7/0002 |
| 2021/0067968 | A1* | 3/2021 | Ragusa | H04W 12/069 |

OTHER PUBLICATIONS

McCracken Jr., Billy G., et al., "Presentation Layer for Portable Electronic Assistant," filed May 14, 2020, U.S. Appl. No. 16/874,576.

\* cited by examiner

*Primary Examiner* — Todd L Barker

(57) ABSTRACT

A method of controlling an environment using a roaming electronic assistant. The method comprises receiving user environment setting preferences, user entertainment service authorizations, and user entertainment authorization credentials from devices in a home environment by an application executing on a computer system, establishing communication by the application with a destination location, receiving information about application programming interfaces (APIs) of devices located in the destination location by the application, establishing communication with the devices located in the destination location by the application based on the API information, whereby a presentation layer of the application is enabled to control the environment of the user at the destination location based on the user environment setting preferences, the user entertainment service authorizations, and the user entertainment authorization credentials.

20 Claims, 6 Drawing Sheets

TECHNICAL LAYER FOR PORTABLE ELECTRONIC ASSISTANT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic assistants provide a variety of convenience features in a home environment. The electronic assistant can be commanded by voice commands from a user to perform a variety of actions on behalf of the user. The electronic assistant can look up answers to questions posed by the user. The electronic assistant can operate controls in the home environment such as turn lights off and on, turn an entertainment device off and on, lock or unlock doors. In some cases the functionality of the electronic assistant may be limited by the capability of devices in the home environment. For example, the electronic assistant may not be able to control devices that do not have a wireless interface.

SUMMARY

In an embodiment, a method of controlling an environment using a roaming electronic assistant is disclosed. The method comprises establishing communication with a plurality of environment control devices in a home environment and with at least one entertainment device in the home environment by an electronic assistant server application executing on a computer system, receiving user environment setting preferences from the environment control devices in the home environment by the electronic assistant server application, and receiving user entertainment service authorizations and user entertainment authorization credentials from the at least one entertainment device in the home environment by the electronic assistant server application. The method further comprises sending user environment setting preferences, user entertainment service authorizations, and user entertainment authorization credentials by the electronic assistant server application to a data store, establishing communication by the electronic assistant server application with a destination location to which the user is scheduled to travel, receiving information about application programming interfaces (APIs) of environment control devices located in the destination location by the electronic assistant server application, and receiving information about APIs of entertainment devices in the destination location by the electronic assistant server application. The method further comprises reading the user environment setting preferences, the user entertainment authorizations, and the user entertainment authorization credentials from the data store and establishing communication with the environment control devices and the entertainment devices located in the destination location by the electronic assistant server application based on the API information, whereby a presentation layer of the electronic assistant server application is enabled to control the environment of the user at the destination location based on the user environment setting preferences, the user entertainment service authorizations, and the user entertainment authorization credentials.

In another embodiment, a roaming electronic assistant platform is disclosed. The system comprises a data store, at least one processor, a non-transitory memory, and an electronic assistant server application stored in the non-transitory memory. When executed by the at least one processor, the electronic assistant server application establishes communication with a plurality of environment control devices and with at least one entertainment device by an electronic assistant server application executing on a computer system, receives user environment setting preferences from the environment control devices by the electronic assistant server application, and receives user entertainment service authorizations and user entertainment authorization credentials from the at least one entertainment device by the electronic assistant server application. The electronic assistant server application further sends user environment setting preferences, user entertainment service authorizations, and user entertainment authorization credentials by the electronic assistant server application to the data store, establishes communication by the electronic assistant server application with a destination location to which the user is scheduled to travel, receives information about application programming interfaces (APIs) of environment control devices located in the destination location by the electronic assistant server application, and receives information about APIs of entertainment devices in the destination location by the electronic assistant server application. The electronic assistant server application further reads the user environment setting preferences, the user entertainment service authorizations, and user entertainment authorization credentials from the data store and establishes communication the environment control devices and the entertainment devices located in the destination location by the electronic assistant server application based on the API information, whereby a presentation layer of the electronic assistant application is enabled to control the environment of a user at the destination location based on the user environment setting preferences, the user entertainment service authorizations, and user entertainment authorization credentials.

In yet another embodiment, a method of controlling an environment using a roaming electronic assistant is disclosed. The method comprises establishing communication with a plurality of environment control devices and with at least one entertainment device by an electronic assistant server application executing on a computer system, receiving user environment setting preferences from the environment control devices by the electronic assistant server application, and receiving user entertainment service authorizations and user entertainment authorization credentials from the at least one entertainment device by the electronic assistant server application. The method further comprises determining by the electronic assistant server application that a user is at a destination location that the user is scheduled to visit, generating a user entertainment authentication token based on the user entertainment authorization credentials, where the token comprises a time-to-live value; and sending the user entertainment authentication token to an entertainment service provider, whereby the entertainment service provider is enabled to map the user entertainment authentication token to the user entertainment authorization credentials. The method further comprises establishing communication with the environment control devices and the entertainment devices located in the destination location by the electronic assistant server application and providing the user entertainment authentication token to an entertainment device in the destination location, whereby the user is enabled to access an entertainment service via the entertainment device at the destination location without providing the user entertainment authorization credentials to the entertainment device in the destination location.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
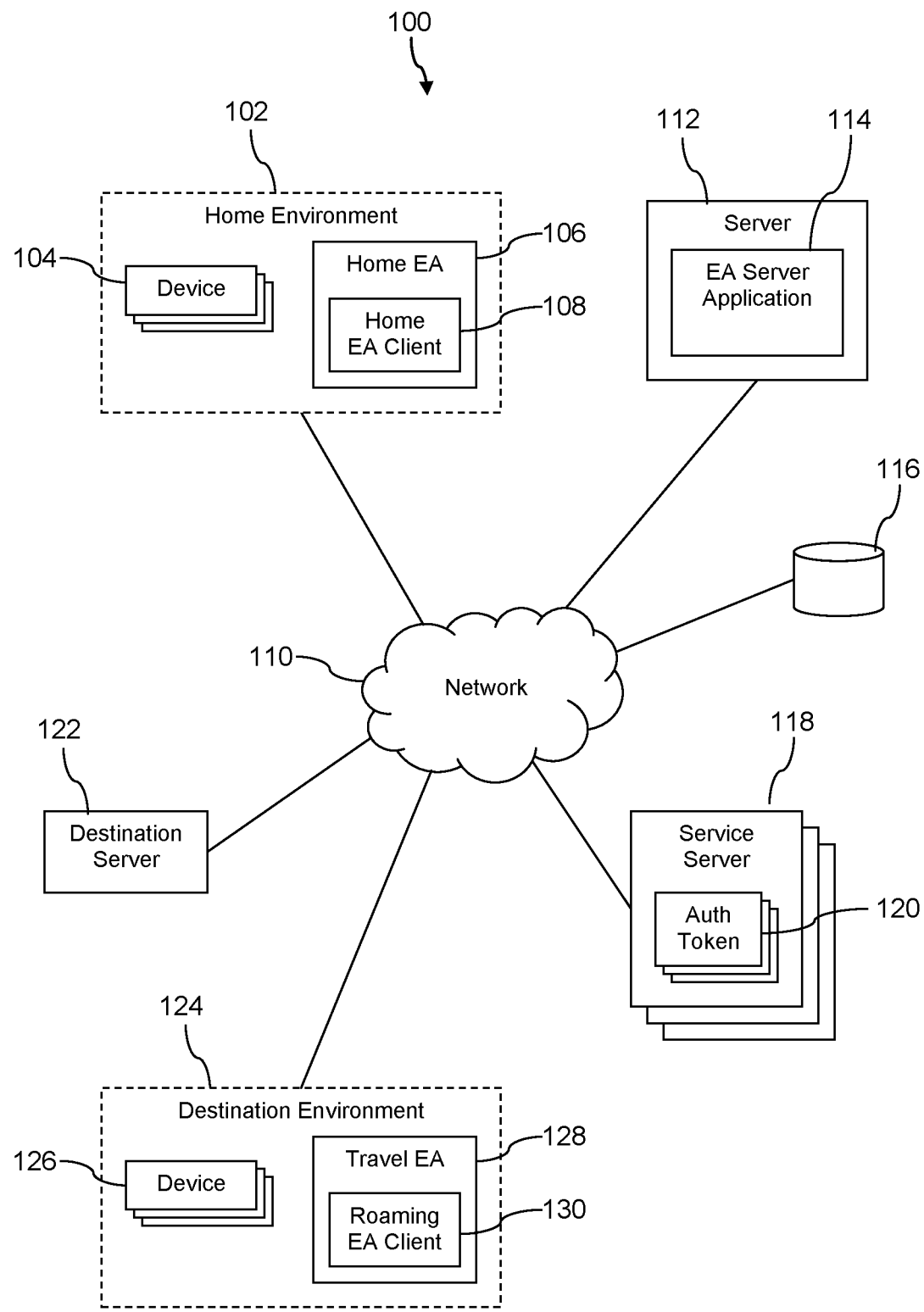
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic assistants provide useful functionality in home environments, but these benefits are not portable to environments outside the home. For example, when a user travels on business and stays overnight in a hotel, the configurations and settings installed in his or her electronic assistant at home are not portable to an electronic assistant that may be present in the hotel room. For example, when a user rents a beach house on Kauai, the configurations and settings installed in his or her electronic assistant at home are not portable to an electronic assistant that may be present in the beach house. To the contrary, in both these examples, the user may have to spend time configuring the electronic assistant with his or her preferences for various settings of controls in the destination environment (e.g., the hotel room or the beach house), spend time defining his or her authorized entertainment services and authorization credentials used to access those entertainment services, and remember to clear those authorization credentials in some way before leaving the destination. In these examples, the user may need to learn different commands to interact with smart devices in the destination environment, for example to turn on and off lights, because of differences between the destination electronic assistant and the electronic assistant in his or her home. The present disclosure teaches a system and method for providing electronic assistant function portability. In some contexts, this may be referred to as a roaming electronic assistant functionality.

The roaming electronic assistant functionality may be provided by a client application executing in the electronic assistant in the home environment, by an electronic assistant server application executing on a computer system, and roaming clients executing in electronic assistants in destination environments. The electronic assistant server application may be referred to as an ubiquitous electronic assistant (EA) application. The EA server application may interrogate the home client application to learn a user's preferred settings in the home environment, for example preferred environment temperature set points at different times of the day, initial or default lighting preferences, and verbal commands for interacting with smart controls in the home environment. The EA server application may interrogate the home client application to learn a user's entertainment service authorizations (e.g., a list of distinctive or premium entertainment services) and authorization credentials for those services. The EA server application may store these in a data store.

The EA server application may determine that the user will be visiting a destination location that has an EA. The EA server application can query the destination EA to learn an application programming interface (API) of that destination EA and of controls of smart devices in the destination environment. The EA server application may conduct this query well in advance of the user arriving at the destination location, for example while the user is flying on an airplane or while the user is traveling from an airport location to the destination location. The EA server application may determine the user's travel itinerary by accessing an electronic schedule of the user, by accessing a travel reservation system used by the user, and/or by monitoring the location of a wireless communication device associated with the user.

The EA server application may query the destination EA to learn the APIs used by the smart controls in the destination environment, whereby to know how to map user preferences and commands in the home environment to the destination environment. The EA server application may query a server operated by the destination environment, for example a server operated by a hotel or a server operated by a rentals management company. The EA server application may learn from the server associated with the destination environment what smart devices are present in the destination environment and what their local identities are. For example, the EA server application may learn that some of the smart controls are a salon light in a hotel room, an entrance light in the hotel room, an over-the-desk light in the hotel room, and a bedside light in the hotel room.

The EA server application can analyze the information on APIs and smart controls associated with the destination environment in advance of the user's arrival at the destination. The EA server application may map user temperature setting preferences in the home environment to temperature setting preferences in the destination environment and configure the destination EA with the user temperature preferences and to configure the destination EA with mappings of the user's customary voice commands to the voice commands applied by the EA in the destination environment. Said in other words, the destination EA is configured in this way to recognize a user's customary voice command, map this to a corresponding command in the destination environment, and then execute the command in the destination environment.

The EA server application may learn what entertainment devices are present in the destination environment and which, if any, of the distinctive entertainment services the user is authorized to use are supported by those entertainment devices in the destination environment. The EA server application may create one or more entertainment service authorization token and share a mapping of these tokens to the associated authorization credentials with the entertainment services. When a destination EA or an entertainment device in the destination environment presents the authorization token to the entertainment service, the entertainment service uses the token to look-up the full authorization credentials, authorizes the user's rights to access the distinctive entertainment service based on the looked-up full authorization credentials, and extends rights to the entertainment device. After the user leaves the destination location, for example boards and airplane and leaves the vicinity of the destination, the EA server application may cause the destination EA and/or entertainment devices in at the destination location to delete the authorization token. Alternatively, in an embodiment, the EA server application may build a time-to-live element or field into the authorization token. If the entertainment device presents an authorization token whose time-to-live element has expired, the entertainment service may deny access to the distinctive entertainment service. In this way, the user avoids the hassle of entering in authorization credentials into entertainment devices and/or EAs at the destination location, and instead the EA server application manages the authorization credentials seamlessly and transparently and without leaving the user's authorization credentials installed in devices at the destination.

Turning now to FIG. 1, a communication system 100 is described. In an embodiment, the system 100 comprises a home environment 102 comprising a plurality of devices 104 and a home electronic assistant (EA) 106 that comprises and/or executes a home EA client application 108. In some contexts, the home EA 106 may be referred to as a home electronic assistant appliance. The home EA 106 may be implemented as a computer. Computers are described further hereinafter. The devices 104 comprise smart devices in the home environment 102, for example light switches, heating ventilation and air conditioning (HVAC) controllers, and appliances that communicate with the home EA 106 via wireless communication links. The devices 104 may comprise one or more entertainment devices, for example a flat-screen television, a set-top box, a multi-application controller that communicate with the home EA 106 via wireless communication links or via wired communication links. A user may use the home EA 106 to control one or more of the devices 104. The user may use the home EA 106 to control devices 104 using natural language voice commands that are received by a microphone in the home EA 106, transcoded by the home EA 106 to digital commands and application programming interface (API) messages distinctive to the devices 104, and transmit API messages to the devices 104 via a wireless communication link or a wired communication link from the home EA 106 to the devices 104. The home EA 106 may be communicatively coupled to a network 110. The network 110 comprises one or more private networks, one or more public networks, and/or a combination thereof. The user may command the home EA 106 with natural language voice commands to look-up information via a communication link via the home EA 106 and via the network 110, for example to a web application executing on a server communicatively coupled to the network 110.

The home EA 106 may learn user preferences for configurations of the devices 104, for example preferred temperature settings for a HVAC controller. The home EA 106 may learn identities of distinctive entertainment services that are supported by one or more devices 104 (e.g., entertainment devices) as well as authorization credentials for the entertainment services. The entertainment services may comprise a streaming video service that a user may subscribe to. The entertainment services may comprise a streaming audio service that a user may subscribe to. The entertainment services may comprise a movie rental service that a user may pay on a pay-per-use or temporary rental basis. The entertainment services may comprise a premium content access service, for example specialized sports content, specialized stock and financial content.

The entertainment service authorization credentials may be a user identity and a password or a phone number and a password or some other set of entertainment service authorization credentials. The home EA 106 may learn the user preferences and entertainment service authentication credentials from the user and then store them, whereby to act on user verbal commands. For example, when verbally commanded to start a streaming video application on a device 104 (e.g., a network connected television), the home EA 106 may establish communication with an entertainment service provider and provide the authorization credentials associated with that distinctive entertainment service. The entertainment service may then stream video to the device 104 associated with the distinctive entertainment service.

The home EA client application 108 may capture the user preferences for configurations of devices 104 and/or entertainment service authorization credentials and send them to an EA server application 114 that executes on a computer system 112. The EA server application 114 may store the user preferences and/or entertainment service authorization credentials in a data store 116. The home EA client 108 may further identify voice commands used by a user to command devices 104 and send mappings of commands to device controls and/or device APIs to the EA server application 114.

While FIG. 1 shows a single home environment and a single home EA 106, it is understood that the system 100 may comprise any number of different home environments 102, each having its own home EA 106, and that the EA server application 114 may interact with all of the home EA clients 108 in similar manners. The EA server application 114 may analyze the settings of a plurality of different home EAs 106 of different home environments 102 to identify patterns and mappings of commands to devices.

The user may travel to different destination environments 124 in connection with business operations away from a home office, with family obligations, and/or with pleasure travel. The destination environment 124 may comprise a hotel room, a rented beach house, a rented ski cottage, an air bed-and-breakfast (air BNB), or a house belonging to a sibling or in-law of the user. The destination environment 124 may be a private house different from the home of the user. The destination environment 124 may be referred to as the destination location in some contexts.

Desirably the user may enjoy the convenience and service of his or her home EA 106 while traveling, but the current paradigm does not support that. To the contrary, the user may have to adapt himself or herself to the idiosyncrasies of a different brand of electronic assistant in the destination environment 124 and possibly reconfigure the electronic assistant in the destination environment 124 to his or her preferences. Often a user may forego use of the electronic assistant in such a destination environment from lack of patience and/or time.

In an embodiment, the destination environment 124 comprises a plurality of devices 126 and a travel EA 128 that executes a roaming EA client application 130. The travel EA 128 may be referred to as a travel electronic assistant appliance in some contexts. The travel EA 128 may be implemented as a computer. The devices 126 comprise smart devices in the destination environment 124 and may be HVAC controls, light switches, and appliances. The devices 126 may comprise one or more entertainment devices for example a television. The devices 126 may communicate with the travel EA 128 via wireless communication links or via wired communication links. The user may use the travel EA 128 to control the devices 104. The roaming EA client application 130 may communicate with the EA server application 114 and learn many of the preferences of the user in the home environment 102 and apply the user's preferences from the home environment 102 to the destination environment 124 via the travel EA 128. Said in other words, the roaming EA client application 130 provides the user with the experience of a roaming EA functionality: the opportunity to interact with the travel EA 128 substantially as he or she would interact with the home EA 106.

The EA server application 114 may learn of the devices 126 in the destination environment 124 in advance of the user arriving at the destination environment 124. The EA server application 114 may have access to a travel itinerary of the user and know when the user will be arriving at the destination environment 124. The EA server application 114 may have access to the location of a wireless communication device belonging to the user and may associate that location with the destination environment 124. The EA server application 114 may interwork with a destination server 122 that is associated with the destination environment 124 and/or with the travel EA 128. For example the destination server 122 may be associated with a hotel chain that owns the destination environment 124 (e.g., a hotel room), or with a rental agency that owns the destination environment 124 (e.g., a rented beach house or ski cottage), or with a service. The EA server application 114 may learn the identities and APIs of devices 126 present in the destination environment 124. The EA server application 114 may analyze the information about the devices 126 to map them to the devices 104 in the home environment 102 and to map user verbal commands used in the home environment 102 to appropriate commands for use in the destination environment 124.

The EA server application 114 may determine that the user is at the destination environment 124 based on an indication of location provided by a wireless communication device of the user, for example a smart phone. The EA server application 114 may determine that the user is at the destination environment 124 based on a confirmation or check-in read from the destination server 122. The EA server application 114, upon arrival of the user at the destination environment 124, may send the user environment setting preferences to one or more devices 126 in the destination environment 124 (for example, the EA server application 114 transmits the user environment setting preferences to the roaming EA client application 130, and the roaming EA client application 130 transmits these environment setting preferences via the travel EA 128 to the HVAC controller via a wireless communication link).

The EA server application 114 may generate an authorization token based on the user entertainment authorization credentials, whereby to protect the actual credentials. The EA server application 114 may provide the authorization token 120 and the matching authorization credentials of the user to an entertainment service provider 118 which stores an association of the authorization tokens 120 and the user authorization credentials. The EA server application 114 may provide the authorization token 120 to the roaming EA client application 130. The roaming EA client application 130 may configure a device 126 in the destination environment 124 with the authorization token 120. The device 126 may then present the authorization token 120 to the entertainment service provider 118 when attempting to access the entertainment service. The entertainment service provider 118 may look up the user authorization credentials based on the presented authorization token 120, verify that the user authorization credentials are valid, and provide the requested access to entertainment service to the requesting device 126.

The authorization token 120 can be destroyed and/or the association between the authorization token 120 and the user authorization credentials can be destroyed after the user leaves the destination environment 124. The EA server application 114 may send an association cancellation to the entertainment service provider 118 instructing that the association between the user authorization credentials and the authorization token 120 be canceled or erased. Alternatively, in an embodiment, the EA server application 114 builds a time-to-live value into the authorization token 120, and the entertainment service provider 118 examines the time-to-live value in an authorization token 120 presented by a device 126 in the destination environment 124. If the time-to-live value is valid, the entertainment service provider 118 provides access to the entertainment service to the device 126. If the time-to-live value is expired, the entertainment service provider 118 denies the requested access to the entertainment service.

As pointed out above, the EA server application 114 interacts with a plurality of different home environments 102 and different home EA client applications 108. Likewise, the EA server application 114 interacts with a plurality of different destination environments 124. The EA server application 114 is able to leverage information learned from a first home EA client application 108 for use with a second home EA client application 108. For example, while different models and brands of home EAs 106 may have different APIs, there are a limited number of different models and brands of home EAs 106, and once the EA server application 114 has learned the APIs of one instance of an EA model and brand it can leverage this knowledge of its APIs with other instances of the same EA model and brand. In the same way, the EA server application 114 is able to leverage information learned from a first roaming EA client application 130 executing in a first travel EA 128 for use with a second roaming EA client application 130 executing in a second travel EA 128 of the same model and brand. The EA server application 114 leverage its mappings of user commands in the home environment 102 and with the home EA 106 to a first destination environment 124 and a first travel EA 128 in determining mappings of these same user commands in the home environment 102 and with the home EA 106 to a second destination environment 124 and a second travel EA 128. Said in other words, the number of different models and brands of EAs 106, 128 and the number of different APIs of devices 104, 126 may be large, this number is finite. Once the analysis has been done for one mapping from a first environment to a second environment has been completed, that mapping can be looked up and used when that same mapping is needed in a different circumstance that engages the same combination of devices 104, 126 and EAs 106, 128.

Figure 2A:
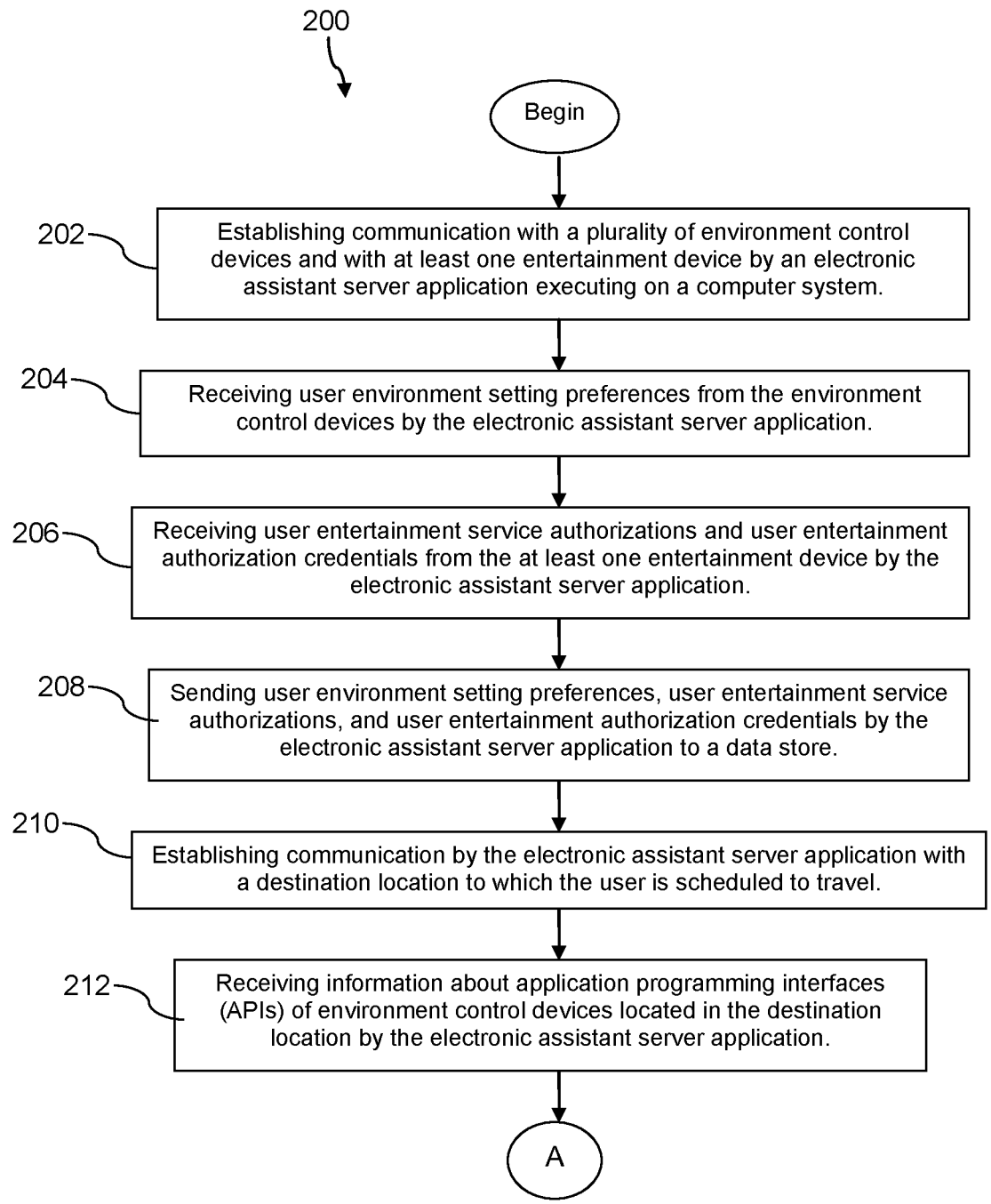
FIG. 2A and FIG. 2B are a flow chart of a method according to an embodiment of the disclosure.
Figure 2B:
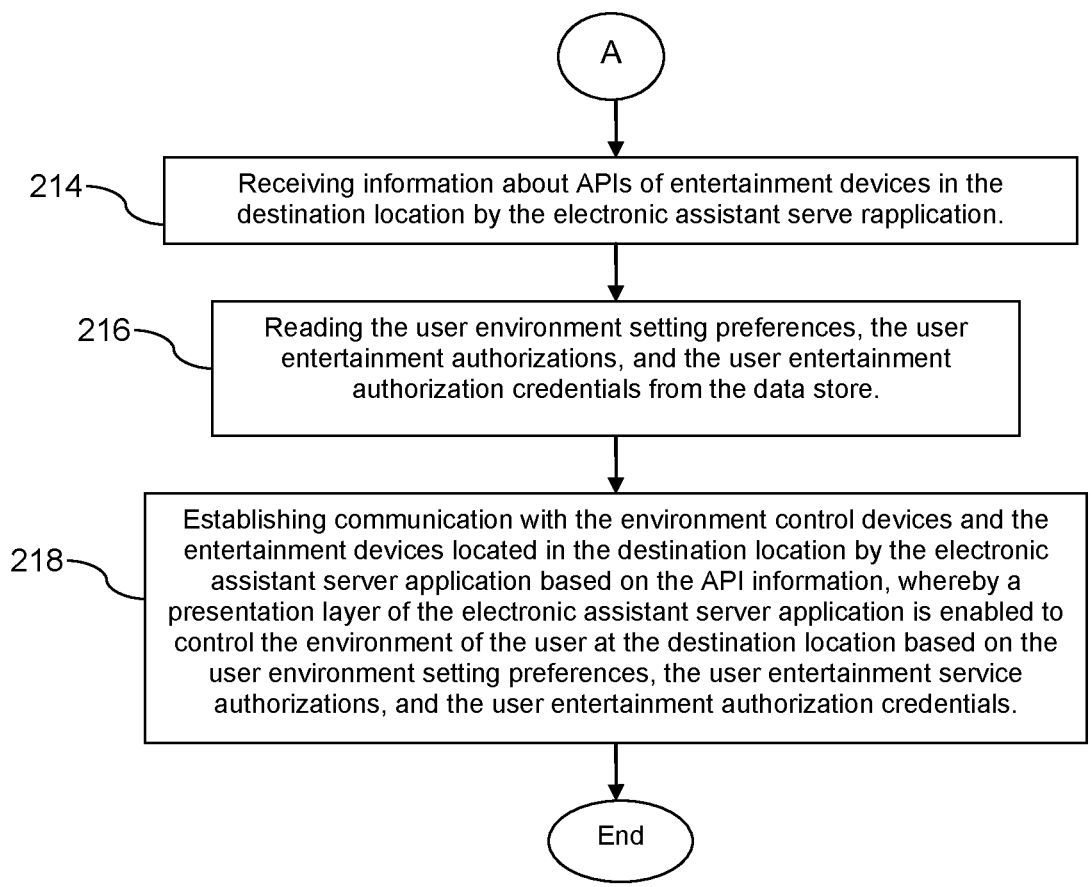

Turning now to FIG. 2A and FIG. 2B, a method 200 is described. In an embodiment, the method 200 is a method of controlling an environment using a roaming electronic assistant. At block 202, the method 200 comprises establishing communication with a plurality of environment control devices and with at least one entertainment device by an electronic assistant server application executing on a computer system. The electronic assistant server application establishing communication with the environment control devices and the at least one entertainment device in the home environment may comprise communicating via the home EA application 108 executing on the home EA 106 (e.g., a home EA appliance) in the home environment 102 with the devices 104.

At block 204, the method 200 comprises receiving user environment setting preferences from the environment control devices by the electronic assistant server application. At block 206, the method 200 comprises receiving user entertainment service authorizations and user entertainment authorization credentials from the at least one entertainment device by the electronic assistant server application.

At block 208, the method 200 comprises sending user environment setting preferences, user entertainment service authorizations, and user entertainment authorization credentials by the electronic assistant server application to a data store. At block 210, the method 200 comprises establishing communication by the electronic assistant server application with a destination location to which the user is scheduled to travel. The electronic assistant server application establishing communication with the environment control devices and the entertainment devices at the destination location may comprise communicating via the roaming EA client application 130 executing on the travel EA 128 (e.g., the electronic assistant appliance in the destination location).

At block 212, the method 200 comprises receiving information about application programming interfaces (APIs) of environment control devices located in the destination location by the electronic assistant server application. At block 214, the method 200 comprises receiving information about APIs of entertainment devices in the destination location by the electronic assistant server application.

At block 216, the method 200 comprises reading the user environment setting preferences, the user entertainment authorizations, and the user entertainment authorization credentials from the data store. At block 218, the method 200 comprises establishing communication with the environment control devices and the entertainment devices located in the destination location by the electronic assistant server application based on the API information, whereby a presentation layer of the electronic assistant server application is enabled to control the environment of the user at the destination location based on the user environment setting preferences, the user entertainment service authorizations, and the user entertainment authorization credentials.

Figure 3A:
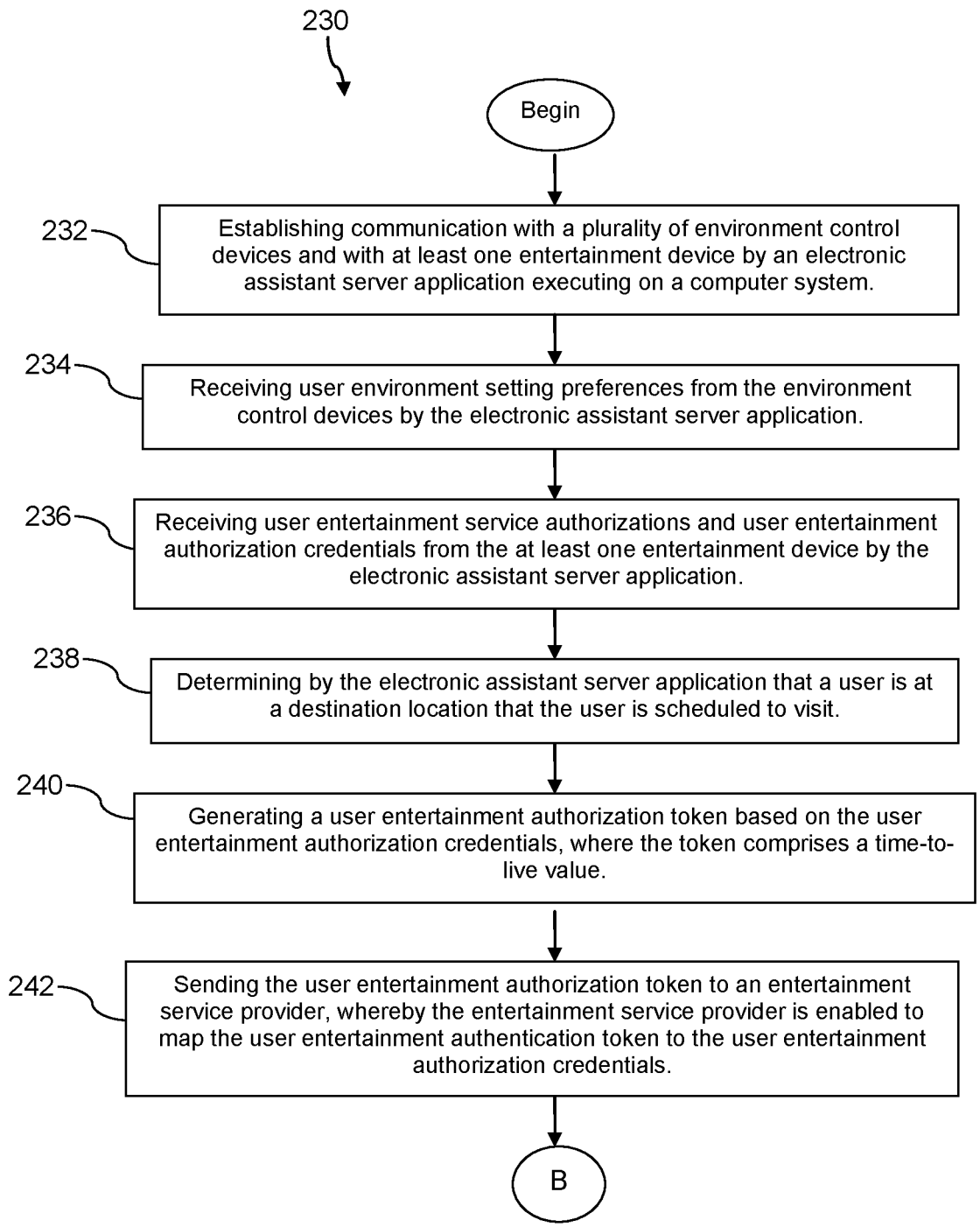
FIG. 3A and FIG. 3B are a flow chart of another method according to an embodiment of the disclosure.
Figure 3B:
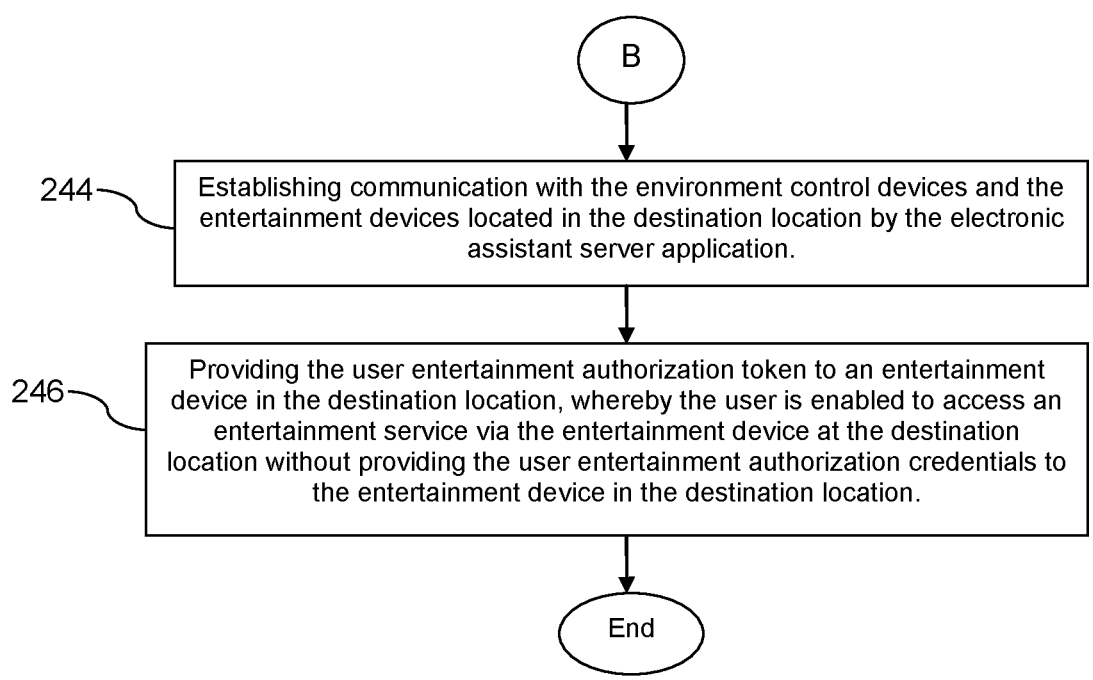

Turning now to FIG. 3A and FIG. 3B, a method 230 is described. In an embodiment, the method 230 is a method of controlling an environment using a roaming electronic assistant. At block 232, the method 230 comprises establishing communication with a plurality of environment control devices and with at least one entertainment device by an electronic assistant server application executing on a computer system.

At block 234, the method 230 comprises receiving user environment setting preferences from the environment control devices by the electronic assistant server application. At block 236, the method 230 comprises receiving user entertainment service authorizations and user entertainment authorization credentials from the at least one entertainment device by the electronic assistant server application.

At block 238, the method 230 comprises determining by the electronic assistant server application that a user is at a destination location that the user is scheduled to visit. At block 240, the method 230 comprises generating a user entertainment authentication token based on the user entertainment authorization credentials, where the token comprises a time-to-live value. At block 242, the method 230 comprises sending the user entertainment authentication token to an entertainment service provider, whereby the entertainment service provider is enabled to map the user entertainment authentication token to the user entertainment authorization credentials. The user entertainment authentication token with the time-to-live value enables the entertainment service provider to restrict access to the entertainment service by the entertainment device in the destination environment 124 after the time-to-live value expires.

At block 244, the method 230 comprises establishing communication with the environment control devices and the entertainment devices located in the destination location by the electronic assistant server application. At block 246, the method 230 comprises providing the user entertainment authentication token to an entertainment device in the destination location, whereby the user is enabled to access an entertainment service via the entertainment device at the destination location without providing the user entertainment authorization credentials to the entertainment device in the destination location.

Figure 4:
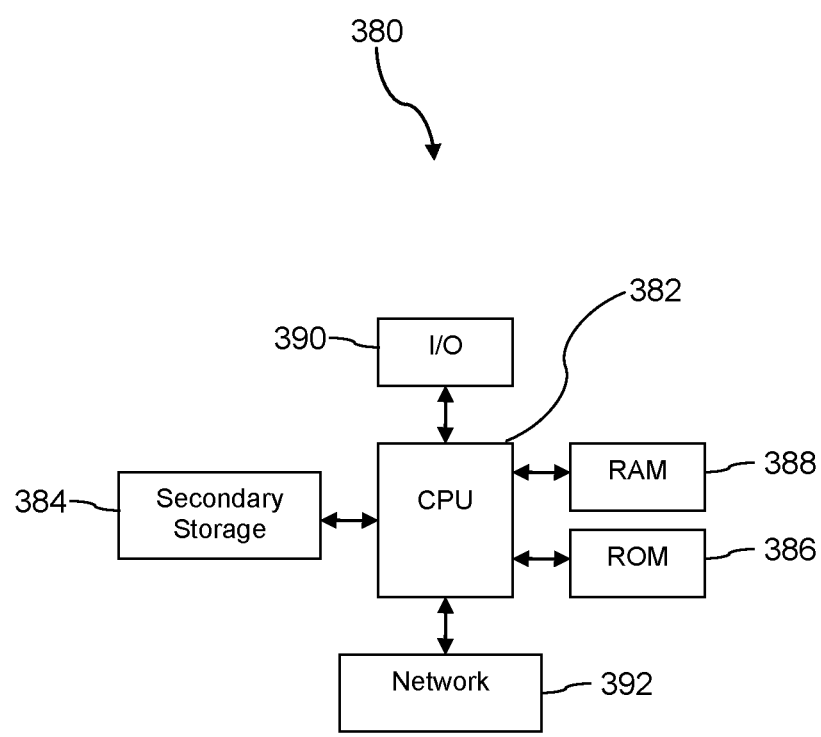
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of controlling an environment using a roaming electronic assistant, comprising:

establishing, by an electronic assistant server application executing on a computer system, communication with a plurality of home environment control devices in a home environment and with at least one home entertainment device in the home environment via a home electronic assistant client application executing on a home electronic assistant appliance in the home environment;

receiving, by the electronic assistant server application from the home electronic assistant client application, user environment setting preferences for the home environment control devices and user voice commands used by a user to interact via the home electronic assistant appliance with the home environment control devices;

receiving user entertainment service authorizations and user entertainment authorization credentials from the at least one home entertainment device by the electronic assistant server application;

sending the user environment setting preferences, the user voice commands, the user entertainment service authorizations, and the user entertainment authorization credentials by the electronic assistant server application to a data store;

establishing communication by the electronic assistant server application with a destination location to which the user is scheduled to travel;

receiving information about application programming interfaces (APIs) of destination environment control devices located in the destination location by the electronic assistant server application;

receiving information about APIs of destination entertainment devices in the destination location by the electronic assistant server application;

reading the user environment setting preferences, the user voice commands, the user entertainment authorizations, and the user entertainment authorization credentials from the data store;

establishing, by the electronic assistant server application based on the API information, communication with the destination environment control devices and the destination entertainment devices via a roaming electronic assistant client application executing on a travel electronic assistant appliance; and transmitting, by the electronic assistant server application, the user environment setting preferences, the user voice commands, the user entertainment authorizations, and the user entertainment authorization credentials to the roaming electronic assistant client application, whereby a presentation layer of the electronic assistant server application is enabled to control the environment of the user at the destination location based on the user environment setting preferences, the user voice commands, the user entertainment service authorizations, and the user entertainment authorization credentials.

2. The method of claim 1, wherein the home and destination environment control devices comprise lights and heating ventilation and air conditioning (HVAC) equipment.

3. The method of claim 1, wherein the destination location is one of a hotel, a rental house, or a house different from the home environment.

4. The method of claim 1, wherein the user environment setting preferences comprise temperature settings.

5. The method of claim 1, wherein the user environment setting preferences comprise initial lighting conditions.

6. The method of claim 1, wherein the user entertainment service authorizations identify a subscription video stream service and the user entertainment authorization credentials comprise authorization credentials for using the subscription video service.

7. A roaming electronic assistant system, comprising:
a data store;
at least one processor;
a non-transitory memory; and
an electronic assistant server application stored in the non-transitory memory that, when executed by the at least one processor:
establishes communication with a plurality of home environment control devices and with at least one home entertainment device via a home electronic assistant appliance in a home environment,
receives user environment setting preferences for the home environment control devices and user voice commands used by a user to interact via the home electronic assistant appliance with the home environment control devices from the home electronic assistant appliance,
receives user entertainment service authorizations and user entertainment authorization credentials from the at least one home entertainment device,
sends the user environment setting preferences, the user voice commands, the user entertainment service authorizations, and the user entertainment authorization credentials to the data store,
establishes communication with a destination location to which the user is scheduled to travel,
receives information about application programming interfaces (APIs) of destination environment control devices located in the destination location,
receives information about APIs of destination entertainment devices in the destination location,
reads the user environment setting preferences, the user voice commands, the user entertainment service authorizations, and the user entertainment authorization credentials from the data store,
establishes, based on the API information, communication with the destination environment control devices and the destination entertainment devices located in the destination location via a travel electronic assistant appliance in the destination location, and
transmits the user environment setting preferences, the user voice commands, the user entertainment authorizations, and the user entertainment authorization credentials to the travel electronic assistant appliance, whereby a presentation layer of the electronic assistant application is enabled to control the environment of a user at the destination location based on the user environment setting preferences, the user voice commands, the user entertainment service authorizations, and the user entertainment authorization credentials.

8. The system of claim 7, wherein the destination location is a hotel, a rental house, or a house different from a home environment.

9. The system of claim 7, wherein the electronic assistant server application further:
generates an authorization token based on the user entertainment authorization credentials, wherein the authorization token comprises a time-to-live value,
sends the authorization token to an entertainment service provider, and
sends the authorization token to one of the destination entertainment devices in the destination environment, whereby use of distinctive services on the one of the destination entertainment devices is enabled by the authorization token.

10. The system of claim 7, wherein the user environment setting preferences comprise temperature settings.

11. The system of claim 7, wherein the user environment setting preferences comprise initial lighting conditions.

12. A method of controlling an environment using a roaming electronic assistant, comprising:
establishing communication with a home plurality of environment control devices and with at least one home entertainment device by an electronic assistant server application executing on a computer system;
receiving user environment setting preferences from the home environment control devices by the electronic assistant server application;
receiving user entertainment service authorizations and user entertainment authorization credentials from the at least one home entertainment device by the electronic assistant server application;
determining by the electronic assistant server application that a user is at a destination location that the user is scheduled to visit;
generating a user entertainment authentication token based on the user entertainment authorization credentials by the electronic assistant server application, where the token comprises a time-to-live value;
sending the user entertainment authentication token and the user entertainment authorization credentials to an entertainment service provider by the electronic assistant server application, whereby the entertainment service provider is enabled to map the user entertainment authentication token to the user entertainment authorization credentials;
establishing communication with destination environment control devices and destination entertainment devices located in the destination location by the electronic assistant server application; and
providing the user entertainment authentication token to a destination entertainment device in the destination location, wherein the destination entertainment device sends the user entertainment authentication token to the entertainment service provider, and wherein the user is enabled to access an entertainment service via the destination entertainment device without providing the user entertainment authorization credentials to the destination entertainment device based on the user entertainment authentication token.

13. The method of claim 12, wherein the electronic assistant server application determines the user is at the destination location based on an indication of location provided by a wireless communication device of the user.

14. The method of claim 12, wherein sending the user entertainment authentication token with the time-to-live value to the entertainment service provider enables the entertainment service provider to restrict access to the entertainment service by the destination entertainment device after the time-to-live value expires.

15. The method of claim 12, wherein the entertainment service accessed via the destination entertainment device is a streaming video service.

16. The method of claim 12, wherein the entertainment service accessed via the destination entertainment device is a streaming audio service.

17. The method of claim 12, further comprising sending the user environment setting preferences by the electronic assistant server application to an environment controller in the destination location, whereby the environment of the destination location is initiated to preferred environmental control settings.

18. The method of claim 12, further comprising providing the user entertainment authentication token to a travel electronic assistant appliance, wherein travel electronic assistant appliance provides the user entertainment authentication token to the destination entertainment device.

19. The method of claim 1, further comprising;
mapping, by the electronic assistant server application, the user voice commands to voice commands applied by the travel electronic assistant appliance in the destination location; and
transmitting, by the electronic assistant server application, the mapping to the travel electronic assistant appliance.

20. The method of claim 19, wherein the travel electronic assistant appliance is configured to recognize a user voice command of the user voice commands used by the user, map the user voice command to a corresponding command in the destination location using the mapping, and execute the corresponding command in the destination location.

\* \* \* \* \*